United States Patent [19]
Suzuki et al.

[11] 3,951,191
[45] Apr. 20, 1976

[54] PNEUMATIC TIRE FOR TRAVEL ON VARIOUS KINDS OF GROUNDS

[75] Inventors: Masahiko Suzuki, Kodaira; Yoshiichi Kasahara, Tokorozawa, both of Japan

[73] Assignee: Bridgestone Tire Company Limited, Tokyo, Japan

[22] Filed: Nov. 1, 1974

[21] Appl. No.: 520,177

[30] Foreign Application Priority Data
Nov. 22, 1973 Japan .............................. 48-130668

[52] U.S. Cl. .......................................... 152/209 R
[51] Int. Cl.² ........................................ B60C 11/06
[58] Field of Search .................... 152/209 R, 209 D; D12/134–140

[56] References Cited
UNITED STATES PATENTS

| | | | |
|---|---|---|---|
| 2,068,050 | 1/1937 | Bishop | 152/209 R |
| 2,124,821 | 7/1938 | Hubach | 152/209 R |
| 2,878,852 | 3/1959 | Lippmann et al. | 152/209 R |
| 3,004,578 | 10/1961 | Braudorn | 152/209 R |
| 3,861,436 | 1/1975 | Poque | 152/209 R |

Primary Examiner—Drayton E. Hoffman
Attorney, Agent, or Firm—Sughrue, Rothwell, Mion, Zinn & Macpeak

[57] ABSTRACT

A pneumatic tire for travel on various kinds of grounds is disclosed. The tire comprises at least two different kinds of tread patterns distant apart from each other in the circumferential direction of the tire. One of these tread patterns has excellent slip resisting property when the tire is used on muddy ground and another tread pattern has high steering stability when the tire is used on hard ground. These two different kinds of tread patterns are mixedly present over any one half of the circumferential length of the tire. In addition, the amount of tread rubber per unit length which corresponds to at least one tenth of the circumferential length of the tire is substantially uniformly distributed along the overall circumferential length of the tire.

12 Claims, 3 Drawing Figures

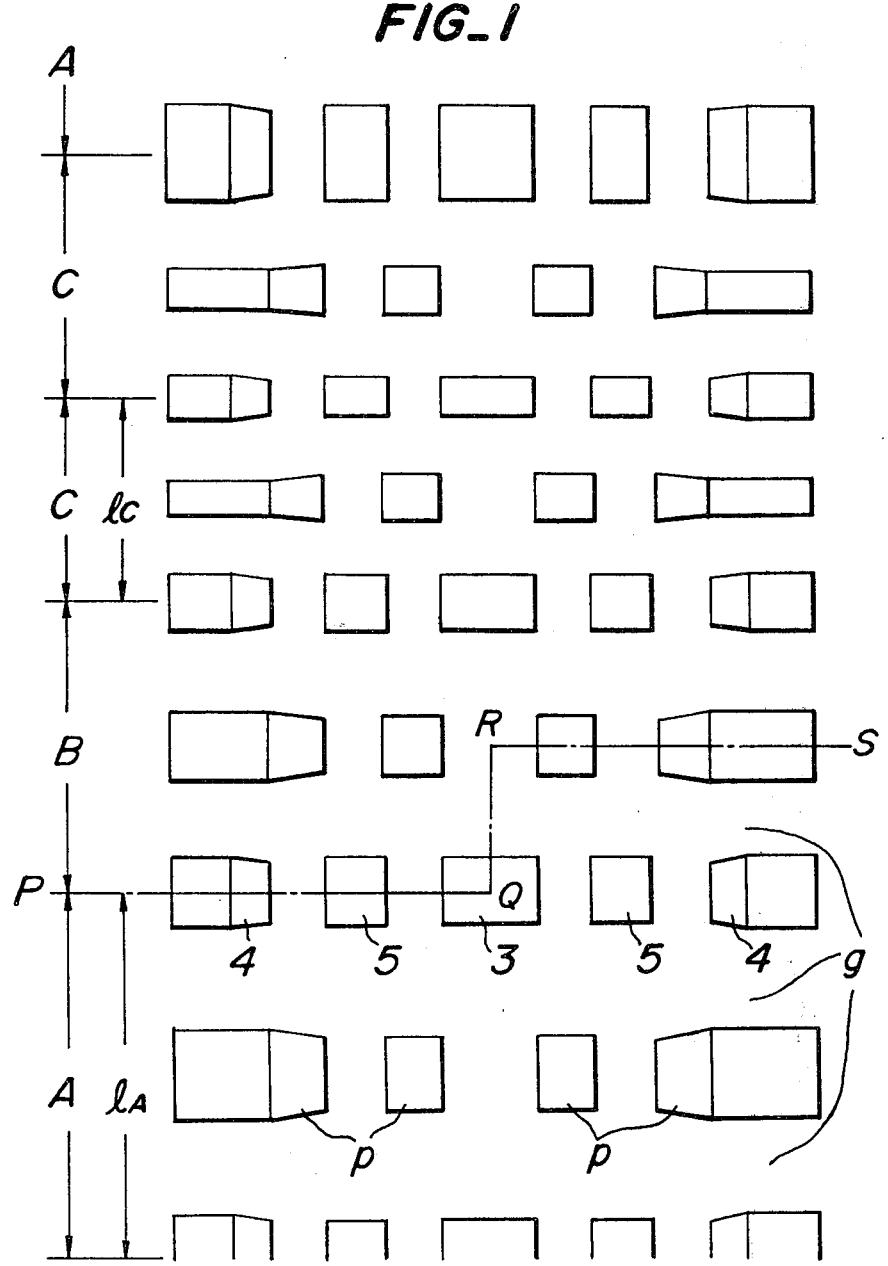

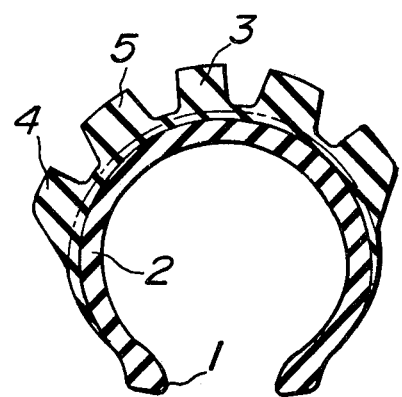
FIG_2
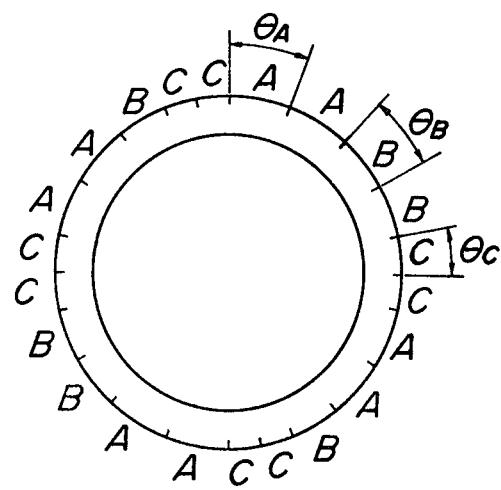
FIG_3

PNEUMATIC TIRE FOR TRAVEL ON VARIOUS KINDS OF GROUNDS

This invention relates to a pneumatic tire for travel on various kinds of grounds, that is, a pneumatic tire having improved steering property and slip resisting property as well as stabilized running performance even when the tire is used not only on general road but also on waste ground inclusive of damp ground, dirty and muddy ground and the like.

An extreme example of tires for multipurpose vehicles such as a jeep, landcruiser and the like adapted to travel on ice and snow covered ground or muddy ground is a tire for motocross racing motorcycles which must run on course provided for waste ground off the road inclusive particularly of damp ground, muddy ground. Such kinds of tires are used under conditions which are considerably different from those of customary tires used mainly on general hard road with or without pavement. That is, these tires are used on grounds whose surface conditions are considerably changed over an extremely wide range.

Heretofore, it has been the common practice to select a tread pattern so constructed as to disregard the running performance of the tire which is used on muddy ground but to attach special importance to the steering stability of the tire which is used on comparatively hard ground or select a tread pattern so constructed as to improve the slip resisting property of the tire which is used on the muddy ground at the sacrifice of the steering stability or select an intermediate tread pattern so constructed as to compromise between the tread pattern suited for travel on the muddy ground on the one hand and the tread pattern suited for travel on the customary hard road on the other hand.

It is a matter of course that the tread pattern suited for travel on the customary hard road has the disadvantage that slip occurs when the tire is used on the muddy ground, and that the tread pattern suited for travel on the muddy ground has the disadvantage that the steering stability becomes degraded when the tire is used on the customary hard road.

That is, a tire having one kind of tread pattern so constructed as to attach the special importance to the steering stability or a tire having one kind of intermediate tread pattern so constructed as to compromise between the tread pattern having an excellent steering stability and the tread pattern having an excellent slip resisting property becomes freely rotated when the tire is used on the muddy ground whose muddiness exceeds a limit beyond which the tire could not be travelled. In such a case, a driver must get out of his vehicle and cause the vehicle to move out of the muddy ground and then start again his vehicle.

Even though the tire is not used on the muddy ground whose muddiness exceeds the limit beyond which the tire could not be travelled, a high degree of skill is required to drive a vehicle when the tire is inclined to be slipped. An unskilled driver is liable to hurry into an error of making rotation of the engine unduly high, thereby freely rotating the tire and hence causing slip. In such a case, a high degree of driving skill is required such that the accelerator is released so as to decrease the torque to be applied to the tire and hence decrease the tractive force in correspondence with the shearing resistance of the ground in contact with the tire. Such high degree of driving skill could not be expected for general drivers.

An object of the invention is to provide pneumatic tires having high steering stability as well as traction force on any kind of the grounds whose surface conditions are changed over an extremely wide range. Another object of the invention is to provide pneumatic tires with which drivers can get out of the extraordinary dirty and muddy ground while maintaining the steering stability on the hard ground.

A feature of the invention is the provision of a pneumatic tire for travel on various kinds of grounds, comprising at least two different kinds of tread patterns, one of these tread patterns having excellent slip resisting property when the tire is used on muddy ground and the other tread pattern having high steering stability when the tire is used on hard ground, both said tread patterns being alternately arranged with each other along the circumferential direction of the tire as well as both of said two different kinds of tread patterns being provided over any one half of the tire circumference, and the amount of tread rubber per unit length which corresponds to at least one tenth of the circumferential length of the tire being uniformly distributed along the overall circumferential length of the tire.

The provision of the two different kinds of tread patterns alternately arranged with each other along the circumferential direction of the tire in accordance with the invention results automatically in that one of these tread patterns causes the other pattern to effectively display its property and hence the tire can rapidly get out of the waste land such as extraordinary dirty and muddy ground while maintaining the steering stability on the customary road and the vehicle can effectively display its maneuverability even when the tire is used on ground whose surface condition is considerably changed. In accordance with the invention, one of at least two different tread patterns consists of projections and grooves comparatively distant apart from each other and the other tread pattern consists of projections and grooves comparatively adjacent with each other. These two different kinds of tread patterns are alternately arranged with each other along the circumferential direction of the tire. This is the basic arrangement of the invention. In addition, these two different kinds of tread patterns are required to mixedly present without being dropped out over any one half of the circumferential length of the tire.

This is because of the fact that it is necessary to avoid concentration of tread patterns having a high slip resisting property and high steering stability, respectively, along the overall circumference of the tire in order to provide a tire having both excellent slip resisting property and excellent steering stability, that if a tread pattern having high slip resisting property extends longer than one half of the circumferential length of a tire, there is a risk of the steering stability being degraded, and that on the contrary if the above mentioned two different kinds of tread patterns are mixedly present without being dropped out over any one half of the circumferential length of the tire, a reliable slip resisting effect can be obtained while maintaining desired steering stability.

In addition, experimental tests have yielded the surprising result that if the above mentioned different kinds of tread patterns are arranged under such condition that the amount of tread rubber per unit length which corresponds to at least one tenth the circumferential length of the tire is substantially uniformly distributed along the overall circumferential length of the tire, the tire balance is prevented from being degraded which is encountered in case of extruding a tread rubber having a constant sectional shape so as to provide a desired smooth tire crown and in case of effecting such treatment as to prevent irregular flow of rubber in a curing mold, and that abrasion produced on each of respective tread patterns can be kept in balance.

The invention will now be described in greater detail with reference to the accompanying drawings, wherein:

FIG. 1 is a developed view showing block patterns arranged according to the invention;

FIG. 2 is a cross-sectional view taken along line P-Q-R-S of FIG. 1;

FIG. 3 is a diagrammatic illustration of the tread patterns arranged according to the invention; and Block patterns shown in FIG. 1 are especially suited for use in motocross racing motorcycles and comprised of three different kinds of block patterns A, B and C. Each of these block patterns is substantially the same in dimension and arrangement in a sectional direction of a tire, while the dimension $l_A$ along the circumferential direction of the block pattern A is made larger than that of the block pattern B and the dimension $l_C$ along the circumferential direction of the block pattern C is made smaller than that of the block pattern B.

For a tire having a size of 4.00-18, it is preferable to make the relative difference among the block patterns A, B and C on the order of $\theta_A \approx 20°$, $\theta_B \approx 16°$ and $\theta_C \approx 12°$ as shown in FIG. 3 where $\theta_A$, $\theta_B$ and $\theta_C$ are central angles formed by the block patterns A, B and C, respectively.

In the embodiment shown in FIG. 1, all of the block patterns A, B and C have a same basic construction comprised of a group of blocks p and a transverse groove g for separating adjacent blocks in the circumferential direction of the tire. For ease of construction, it is preferable to make the width of the transverse groove g measured in the circumferential direction of the tire smaller in succession such, for example, as on the order of 34 mm for the block pattern A, 25 mm for the block pattern B, and 16 mm for the block pattern C.

The use of the block patterns described ensures ease of clogging mud in the narrower transverse groove g of the block pattern C and provides the important advantage that the block pattern C causes the tire to slip at a comparatively earlier time and hence freely rotate, and that subsequently the wider block pattern B or A can produce an effective tractive force.

The basic idea of the invention consists in that the block pattern C clogged with mud causes slip of the tire so as to rapidly bring the block pattern A into operation, thereby time loss in motocross race being effectively avoided. The tread pattern B can intermediately operate in dependence with the ground surface condition. The block pattern B may be omitted and use may be made of only two kinds of block patterns A and C in the order of, preferably, A-C-A-C . . . ; AA-CC . . . ; AA-C-AA-C . . . ; CC-A-CC-A . . . ; AAA-CC-AAA-CC . . . ; CCC-AA-CCC-AA . . . ; etc.

As described above, the main difference between the block patterns A and C lies in that the width of the transverse groove g in the circumferential direction of the tread pattern A is wider than that of the tread pattern C. This difference is capable of giving the tire the slip resisting property when the tire is used on muddy ground.

If the weight of rubber per unit length in the circumferential direction of the tire is not uniformly distributed, the tire becomes unbalanced. In general, in the case of forming the tread, the rubber is extruded into a contour having a uniform thickness along the circumferential direction of the tire and having such a cross-sectional shape that the rubber flows in a smooth stream. As a result, it is practically impossible to change the thickness of the tread at every block pattern along the circumferential direction of the tire. Thus, the volume of rubber per unit length in the circumferential direction of the tire is required to be substantially constant. In order to satisfy such requirement, it is preferable to change the circumferential length of respective groups of blocks in dependence with the circumferential widths of the transverse grooves such that the change of the volume of rubber can effectively be avoided irrespective of the difference between the circumferential widths of the respective transverse grooves g. That is, the circumferential length of each of the blocks belonging to the block pattern A and separated from each other by the transverse groove g having a wide circumferential width may be made longer than those of the blocks belonging to the block patterns B and C in the order mentioned.

As a result, the block pattern A is capable of effectively avoiding the degradation of the steering stability caused by deformation of the group of blocks p when these blocks make contact with the ground, of producing a positive tractive force when the tire is used on muddy ground, and of maintaining a high steering stability of the tire as a whole since the block pattern A is adjacent directly or through the block pattern B to the block patterns C which are distant apart from each other by the transverse groove g whose circumferential width is small.

In the embodiment shown in FIG. 1, those blocks of the block patterns A and B which are located at each side shoulder portion of the tire are outwardly enlarged in their circumferential width, respectively, while that block of the block pattern C which is located at each side shoulder portion of the tire is slightly reduced outwardly in its circumferential width. The use of the block pattern C constructed as above described prevents the block pattern C from being excessively clogged with mud and ensures easy removal of the mud from the block pattern C. In addition, the use of the block patterns A and B constructed as above described renders it possible to improve the steering stability of a vehicle particularly at the time of its cornering. In FIG. 2 is shown a cross-section of a tire taken along line P-Q-R-S of FIG. 1, the tire having the block patterns described above. Reference numeral 1 designates a pair of bead portions, 2 a side portion, 3 a center block, 4 a side block, and 5 an intermediate block. In FIG. 2, a reinforcing construction such as bead wires, carcass and breaker is omitted for ease of illustration.

It is preferable not to alternately arrange the block patterns A, B and C with each other along the circumferential direction of the tire in the order as mentioned such, for example, as A, B, C, A, B, C . . . , but to alternately arrange the block patterns A, B and C in the circumferential direction in a manner such that at least two same block patterns are arranged side by side and between these two block patterns is inserted another kind of block pattern such, for example, as C, C, B, A, A, C, C, B, B, A, A, . . . as shown in FIG. 3. In addition, it is particularly preferable to arrange the same block pattern or patterns at diametrically opposite positions of the tire symmetrically with respect to the center axis of the tire as shown in FIG. 3. In the present embodiment, the block patterns are arranged as AABB-CCAABCC-AABBCCAABCC.

In the case of alternately arranged the block patterns with each other along the circumferential direction of the tire inclusive of a case in which the same kind of block patterns are arranged side by side, it is preferable to determine a ratio of the minimum length $l_C$ of the block pattern C in the circumferential direction to the maximum length $l_A$ of the block pattern A within a range of 0.4 to 0.8, particularly, 0.55 as shown in FIG. 1.

If the ratio $l_C/l_A$ becomes smaller than 0.4 the slip resisting property is maintained, but the steering stability becomes degraded. On the contrary, if the ratio $l_C/l_A$ exceeds 0.8, the slip resisting property becomes insufficient.

As seen from the above embodiments, the term "alternately arrange" shall be understood not only to alternately arrange at least two different kinds of tread patterns A and C or a tread pattern D on the one hand and a tread pattern E or F on the other hand with each other with or without adding an intermediate tread pattern B or G along the circumferential direction of the tire, preferably, in the order of A-C-A-C . . . ; AA-C-AA-C . . . ; A-B-C-A-B-C . . . ; etc. but also to arrange either one or both of at least two different kinds of tread patterns side by side along the circumferential direction of the tire such, for example, as in the order of AAA-B-AA-C-AA-B-C . . . ; A-B-C-A-C-B-A-B-A-B . . . ; C-C-B-A-A-C-C-B-B-A-A . . . Thus, the tread pattern arrangement according to the invention is based on the alternate order of A-C-A-C inclusive of modified arrangements in which the tread patterns A and C or the tread pattern B or its modified pattern B' are or is inserted between the tread patterns A and C and in which a modified pattern A' composed of AA or another modified pattern C' composed of CC or a further modified pattern A'' composed of ABA is included.

As stated hereinbefore, the use of the pattern arrangement according to the invention ensures a slip resisting property of a tire capable of getting out of waste land whose surface conditions are considerably changed such as extremely muddy ground in a comparatively simple and rapid manner while maintaining a high steering stability and hence provides the important advantage that vehicles mounted with the tire according to the invention can effectively display their excellent maneuverability when the tire is used on grounds whose surface conditions are considerably changed over an extremely wide range.

What is claimed is:

1. A pneumatic tire for two-wheeled vehicles for travel on various kinds of ground, comprising a tread pattern including a number of blocks each separated from adjacent blocks by transverse grooves and a plurality of circumferential grooves and constituting two kinds of block patterns, A and C, one block pattern A having an excellent slip resisting property for travel on muddy ground and block pattern C having a high steering stability for travel on hard ground, said blocks being uniformly arranged over one half of the tire circumference, the amount of tread rubber per unit length which corresponds to at least one tenth of the circumferential length of the tire being substantially uniformly distributed along the overall circumferential length of the tire, said tread patterns A and C being alternately arranged with each other along the overall circumferential length of the tire, and the width of a transverse groove g separating the blocks from each other in the block pattern A measured in the circumferential direction of the tire being made larger than the transverse groove g separating the blocks from each other in the block C.

2. A pneumatic tire for two-wheeled vehicles for travel on various kinds of ground as claimed in claim 1, wherein said tread pattern is composed of block patterns ACAC . . . ; AA-CC . . . ; AA-C-AA-C . . . ; CC-A-CC-A . . . ; AAA-CC-AAA-CC . . . ; CCC-AA-CCC-AA . . . ; etc.

3. A pneumatic tire for two-wheeled vehicles for travel on various kinds of ground as claimed in claim 1, wherein a ratio of the minimum circumferential length $l_A$ of the block pattern A is within a range of 0.4 to 0.8.

4. A pneumatic tire for two-wheeled vehicles for travel on various kinds of ground as claimed in claim 1, wherein the size of the blocks in the block pattern A is larger than the size of the blocks in the block pattern C.

5. A pneumatic tire for two-wheeled vehicles for travel on various kinds of ground as claimed in claim 1, wherein between said block patterns A and C is arranged at least one block pattern B having both moderate steering stability and slip resisting properties, said blocks A, B and C being alternately arranged with each other along the circumferential direction of the tire in the order of A-B-C-A-B-C . . . ; A-B-C-A-C-B-A-B-A-B . . . ; AAA-B-AA-C-AA-B-C . . . ; C-C-B-A-A-C-C-B-B-A-A . . . .

6. A pneumatic tire for two-wheeled vehicles for travel on various kinds of ground as claimed in claim 5, wherein the width of the transverse groove g for the block patterns A, B and C measured in the circumferential direction of the tire is decreased in succession in the block patterns A, B and C respectively.

7. A pneumatic tire for two-wheeled vehicles for travel on various kinds of ground as claimed in claim 5, wherein the size of the blocks belonging to the block patterns A, B and C is made smaller in succession in the block patterns A, B and C respectively.

8. A pneumatic tire for two-wheeled vehicles for travel on various kinds of ground as claimed in claim 5, wherein said three different kinds of block patterns A, B and C have central angles $\theta_A$, $\theta_B$ and $\theta_C$ respectively, defined by the relationship $\theta_A > \theta_B > \theta_C$.

9. A pneumatic tire for two-wheeled vehicles for travel on various kinds of ground as claimed in claim 8, wherein said three different kinds of block patterns A, B and C have central angles $\theta_A$, $\theta_B$ and $\theta_C$ of 20°, 16° and 12° respectively.

10. A pneumatic tire for two-wheeled vehicles for travel on various kinds of ground as claimed in claim 5, wherein at least one same block pattern is arranged at diametrically opposite positions of the tire symmetrically with respect to the center axis of the tire.

11. A pneumatic tire for two-wheeled vehicles for travel on various kinds of ground as claimed in claim 5, wherein the blocks of the block pattern A and B, which are located at each side shoulder portion of the tire, are outwardly enlarged in their circumferential width, respectively, while that block of the block pattern C, which is located at each side shoulder portion of the tire, is slightly reduced outwardly in its circumferential width.

12. A pneumatic tire for travel on various kinds of ground as claimed in claim 1 wherein the ratio of the minimum circumferential length $l_C$ of the block pattern C to the maximum circumferential length $l_A$ of the block pattern A is 0.55.

* * * * *